United States Patent [19]

Nanba et al.

[11] Patent Number: 4,832,427
[45] Date of Patent: May 23, 1989

[54] HOLOGRAPHIC DISPLAY SYSTEM

[75] Inventors: Sinzi Nanba, Kariya; Toru Mizuno, Aichi; Satoshi Koike, Kariya; Tukasa Goto, Kariya, all of Japan

[73] Assignee: Nippondenso Co., Ltd., Kariya, Japan

[21] Appl. No.: 152,763

[22] Filed: Feb. 5, 1988

[30] Foreign Application Priority Data

Feb. 6, 1987 [JP] Japan .................................. 62-26970

[51] Int. Cl.[4] .................... G02B 5/32; G02B 27/14; G03H 1/28
[52] U.S. Cl. .................................. 350/3.72; 350/3.7; 350/3.77; 350/174
[58] Field of Search ................. 350/3.7, 3.72, 3.77, 350/174

[56] References Cited

U.S. PATENT DOCUMENTS

| | | | |
|---|---|---|---|
| 4,261,647 | 4/1981 | Ellis | 350/174 |
| 4,407,564 | 10/1983 | Ellis | 350/3.7 X |
| 4,560,233 | 12/1985 | Banbury | 350/3.7 |
| 4,613,200 | 9/1986 | Hartmann | 350/3.7 |
| 4,655,540 | 4/1987 | Wood et al. | 350/3.7 |
| 4,763,990 | 8/1988 | Wood | 350/3.7 X |

FOREIGN PATENT DOCUMENTS

| | | | |
|---|---|---|---|
| 0066496 | 12/1982 | European Pat. Off. | 350/3.72 |
| 55-77713 | 6/1980 | Japan . | |
| 61-35416 | 2/1986 | Japan . | |
| 61-289320 | 12/1986 | Japan . | |

Primary Examiner—John K. Corbin
Assistant Examiner—David J. Edmondson
Attorney, Agent, or Firm—Cushman, Darby & Cushman

[57] ABSTRACT

A display source emits light. A first hologram receives the light from the display source and diffracts the received light. The light from the display source is applied to the first hologram at an incident angle A1 and moves from the first hologram at an outgoing angle B1. A second hologram receives the light from the first hologram and diffractively reflects the received light. The light diffractively reflected by the second hologram forms an image of the display source in viewer's field of view. The light from the first hologram is applied to the second hologram at an incident angle A2 and moves from the second hologram at an outgoing angle B2. The first and second holograms are nonparallel to remove a ghost image of the display source which would result from at least one of surface reflections at the first and second holograms. The first hologram has an angle $\theta$ relative to the second hologram. The angles A1, B1, A2, B2, and $\theta$ are in a fixed relationship to remove chromatic aberration which would result from the nonparallel arrangement of the first and second holograms.

10 Claims, 8 Drawing Sheets

HOLOGRAPHIC DISPLAY SYSTEM

BACKGROUND OF THE INVENTION

1. Field of the Invention

This invention relates to a holographic display system, and specifically relates to, for example, a holographic head-up display system.

2. Description of the Prior Art

Systems commonly used in aircraft to display images of instruments in the field of view of a pilot are termed "head-up displays". In general, the head-up displays employ optical elements or holographic elements to project an image of an instrument into the pilot's field of view as the pilot looks through the forward window of the aircraft.

U.S. Pat. No. 4,261,647 and U.S. Pat. No. 4,655,540 disclose such head-up displays.

U.S. Pat. No. 4,613,200 discloses a head-up display system usable in an automotive vehicle. Specifically, the head-up display system of U.S. Pat. No. 4,613,200 utilizes two parallel holographic optical elements to project a virtual image of an indicia display source. The virtual image is superimposed in the driver's field of view as the driver looks at the forward scene through the vehicle windshield. The parallel arrangement of the holographic optical elements ensures that the virtual image is free of chromatic aberrations.

It was experimentally found that, in a head-up display system which had two parallel holographic optical elements as disclosed in U.S. Pat. No. 4,613,200, there were a desired virtual image and also unwanted virtual images of an indicia display source in the driver's field of view. The unwanted images extended near the desired image or partially overlapped the desired image.

SUMMARY OF THE INVENTION

It is an object of this invention to provide a holographic display system which can remove unwanted images of a display source.

It is another object of this invention to provide a holographic display system which can produce a display source virtual image free of chromatic aberrations.

In a holographic display system of this invention, a display source emits light, and a first hologram receives the light from the display source and diffracts the received light. The light from the display source is applied to the first hologram at an incident angle A1 and moves from the first hologram at an outgoing angle B1. A second hologram receives the light from the first hologram and diffractively reflects the received light. The light diffractively reflected by the second hologram forms an image of the display source in viewer's field of view. The light from the first hologram is applied to the second hologram at an incident angle A2 and moves from the second hologram at an outgoing angle B2. The first and second holograms are nonparallel to remove a ghost image of the display source which would result from at least one of surface reflections at the first and second holograms. The first hologram has an angle θ relative to the second hologram. The angles A1, B1, A2, B2, and θ are in a fixed relationship to remove chromatic aberration which would result from the nonparallel arrangement of the first and second holograms.

DESCRIPTION OF THE FIRST PREFERRED EMBODIMENT

Figure 1:
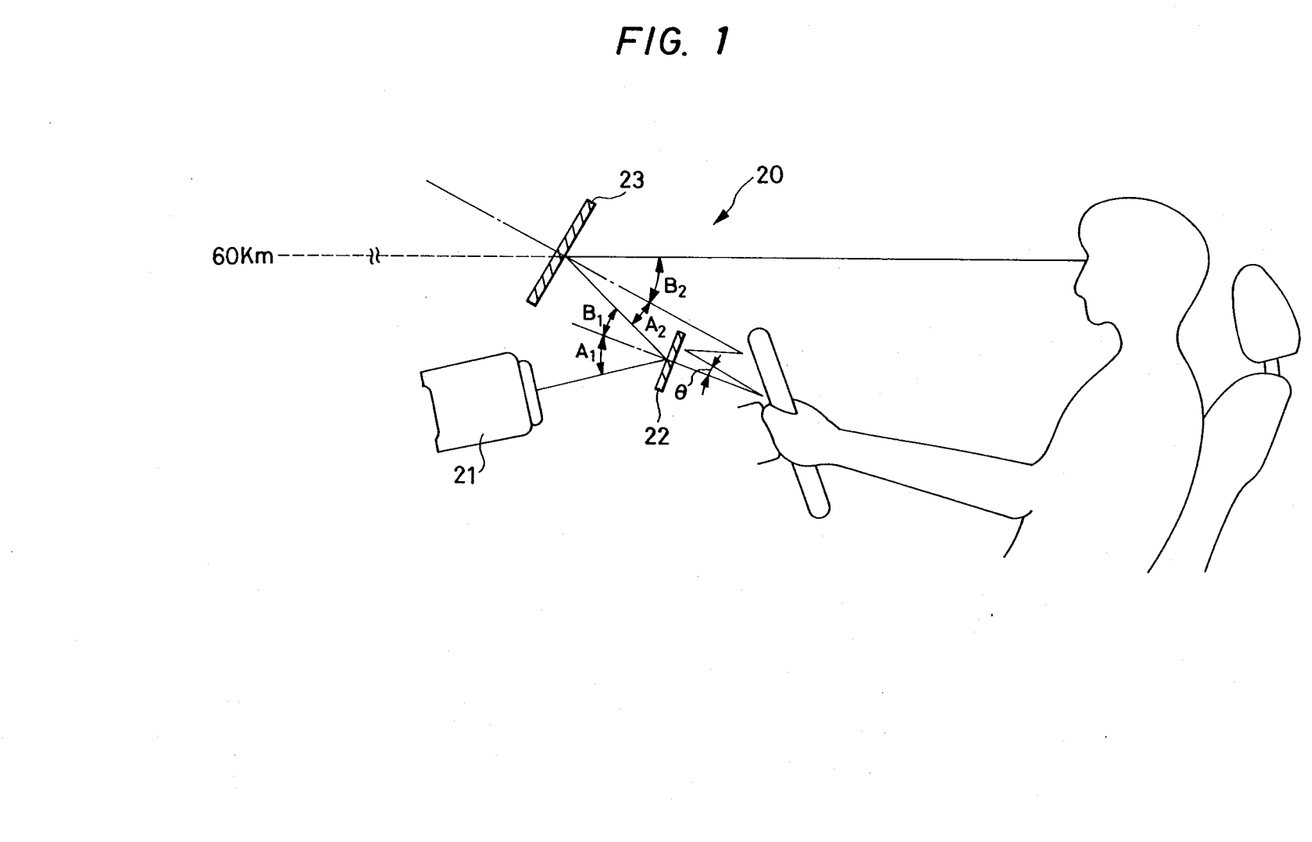
FIG. 1 is a diagram of a holographic display system according to a first embodiment of this invention.
Figure 2:
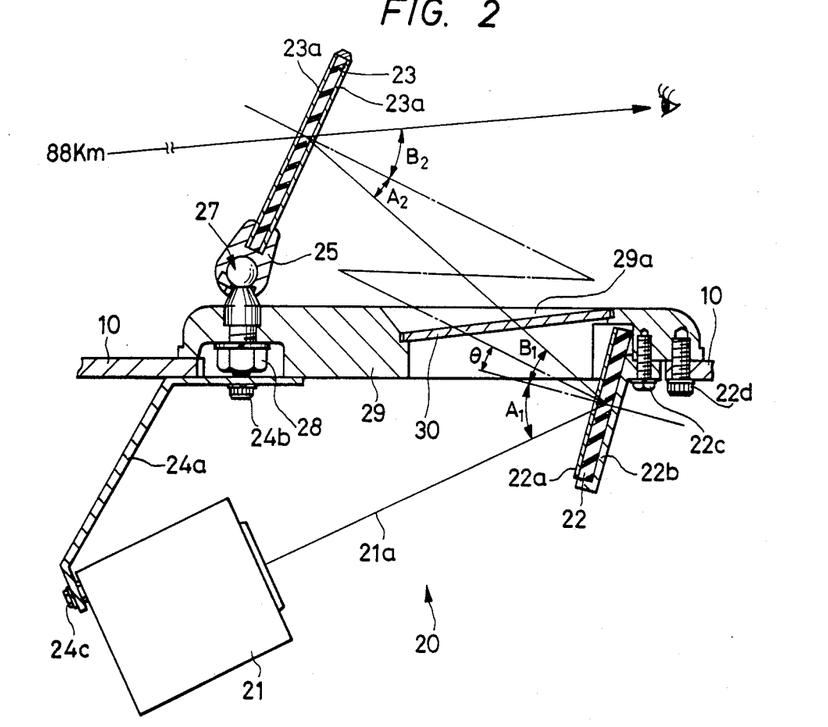
FIG. 2 is a sectional view of the holographic display system of FIG. 1.
Figure 3:
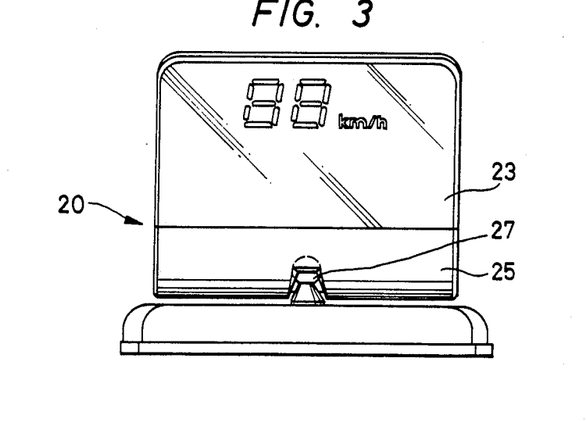
FIG. 3 is a front view of the holographic display system of FIG. 1.

With reference to FIGS. 1 to 3, a holographic head-up display system 20 according to a first embodiment of this invention includes a fluorescent character display tube 21 and a pair of holograms or holographic optical elements 22 and 23 which are all supported on a vehicle dashboard 10. The hologram 23 is closer to a vehicle front window or windshield than the other hologram 22 is.

The display tube 21 emits light indicating information such as a current vehicle speed or a current engine speed. For example, the light emitted by the display tube 21 is of a green-based color, having wavelengths around 520 nm. The display tube 21 is secured to the vehicle dashboard 10 by means of an attachment plate 24a and bolts 24b and 24c. Specifically, the display tube 21 is fixed to the attachment plate 24a by the bolt 24c. A portion of the vehicle dashboard 10 is securely held between the attachment plate 24a and a base 29 which are connected by the bolt 24b.

The hologram 22 is centered at an optical axis 21a with respect to the display tube 21 so that the hologram 22 is exposed to the light emitted by the display tube 21. The hologram 22 behaves as a reflective diffraction grating causing an incident light beam to be diffracted and reflected. Accordingly, the hologram 22 reflects the light emitted from the display tube 21.

The hologram 22 is bonded to an attachment plate 22b which is fixed to the base 29 by a bolt 22c. A portion of the base 29 is fixed to the vehicle dashboard 10 by a bolt 22d.

Figure 4:
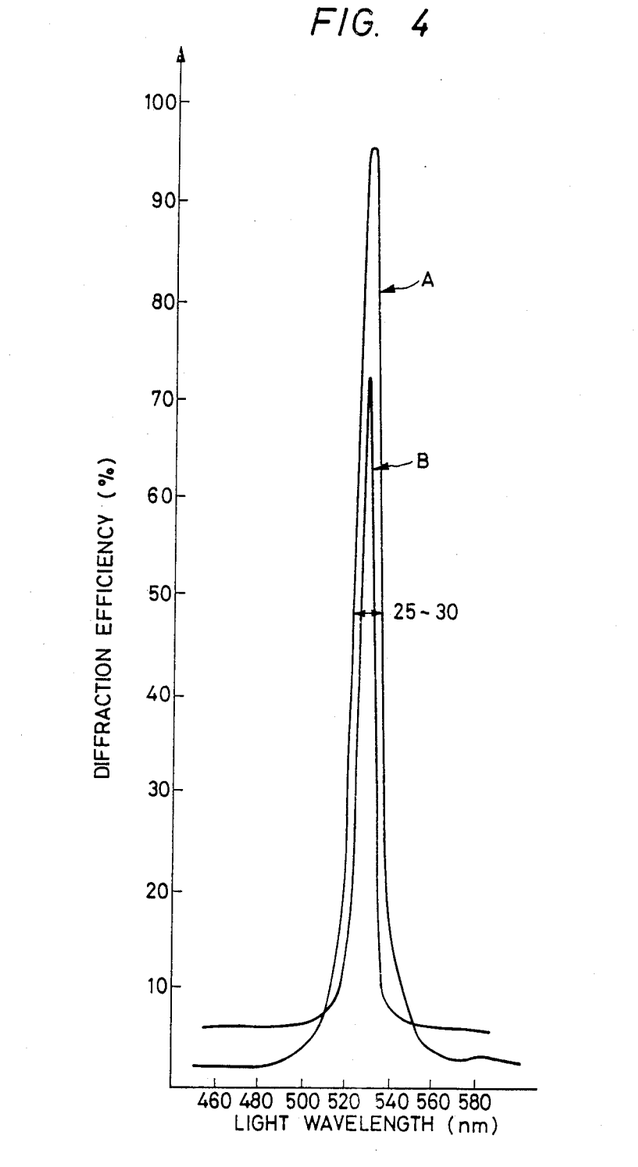
FIG. 4 is a graph of the relationships between diffraction efficiency and incident light wavelength in the holograms of FIGS. 1-3.

The diffraction efficiency of the hologram 22 varies with the wavelength of the incident light as shown by the curve A in FIG. 4. Specifically, the hologram 22 serves as a concave mirror reflecting light of wavelengths in a predetermined range. The predetermined range of the wavelengths of the reflected light extends between 520 and 530 nm. The diffraction efficiency of the hologram 22 peaks at a light wavelength of 525 nm. The highest diffraction efficiency of the hologram 22 is around 93%. The half-width of the diffraction efficiency peak is 25–30 nm. Accordingly, the hologram 22 selects the light of the predetermined wavelengths and reflects the selected light. A surface of the hologram 22 is coated with multilayer films 22a to prevent unwanted reflection and to cut off ultraviolet rays.

The hologram 23 is exposed to the light reflected by the hologram 22. The hologram 23 behaves as a reflective diffraction grating causing an incident light beam to be diffracted and reflected. Accordingly, the hologram 23 reflects the incident light traveled from the hologram 22. Specifically, the hologram 23 serves as a concave mirror projecting a virtual image of the information indicated on the display tube 21. The virtual image is superimposed in the vehicle driver's field of view as the driver looks at the forward scene through the vehicle windshield.

The hologram 23 is held by a frame 25 which is pivotally supported on the base 29 via a pivot 27. The pivot 27 is connected to the base 29 via a combination of a threaded extension and a nut 28. The hologram 23 can rotate about the pivot 27 in various directions so that the angle of the hologram 23 can be adjusted relative to the hologram 22. The angular adjustment of the hologram 23 is used to vary the location of the virtual image of the indicated information.

The base 29 has an opening 29a which allows the light to travel from the hologram 22 to the hologram 23. A protective glass plate 30 fitted in the opening 29a prevents dust from falling onto the hologram 22. Opposite surfaces of the glass plate 30 have antireflection coats.

The diffraction efficiency of the hologram 23 varies with the wavelength of the incident light as shown by the curve B in FIG. 4. Specifically, the hologram 23 serves as a concave mirror reflecting light of wavelengths in a predetermined range. The predetermined range of the wavelengths of the reflected light extends between 520 and 530 nm. The diffraction efficiency of the hologram 23 peaks at a light wavelength of 525 nm. The highest diffraction efficiency of the hologram 23 is around 73%. Accordingly, the hologram 23 selects the light of the predetermined wavelengths and reflects the selected light. Both surfaces of the hologram 23 are coated with multilayer films 23a to prevent unwanted reflection and to cut off ultraviolet rays. The multilayer films 23a produces a reflectivity of approximately 0.5–1.0%.

The angles of the holograms 22 and 23 are chosen so as to remove unwanted or ghost images of the indicated information. It should be noted that unwanted or ghost images of the indicated information would result from the light diffractively reflected by the hologram 22 and then reflected at the surface of the hologram 23 or from the light reflected at the surface of the hologram 22 and then diffractively reflected by the hologram 23.

Figure 5:
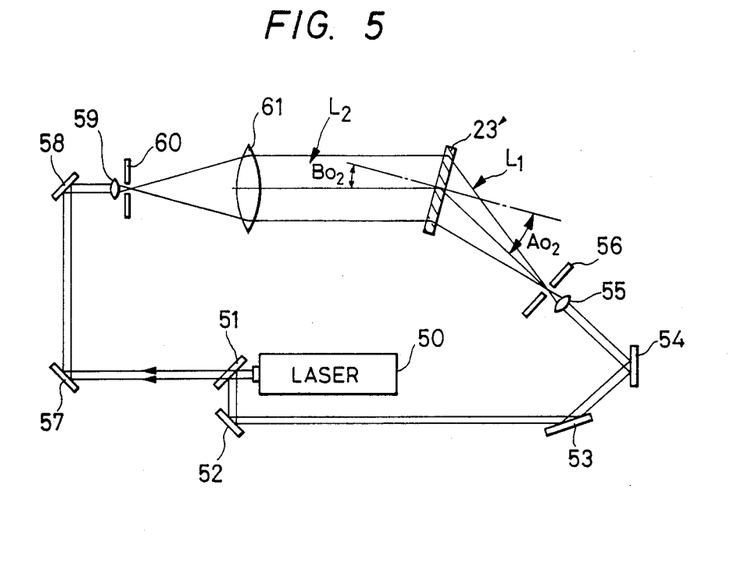
FIG. 5 is a diagram of an exposure apparatus for manufacturing the holograms of FIGS. 1-3.

The manufacture of the hologram 23 will be described hereinafter. As shown in FIG. 5, an argon laser 50 emits light having a wavelength of 514 nm. The light emitted from the laser 50 is divided into two beams of light by a half mirror 51. One beam of light travels from the half mirror 51 to a hologram dry plate 23' via mirrors 52, 53, and 54, a convex lens 55, and a pin hole 56. This beam of light is applied to a back surface of the hologram dry plate 23' as reference light L1 of spherical wave. The other beam of light travels from the half mirror 51 to the hologram dry plate 23' via mirrors 57 and 58, a convex lens 59, a pin hole 60, and a convex lens 61. This beam of light is applied to a front surface of the hologram dry plate 23' as object light L2 of plane wave. The reference wave L1 and the object wave L2 form a pattern of interference fringes on the hologram dry plate 23'. The pattern of interference fringes is recorded by photo-sensitive material of the hologram dry plate 23'. The hologram dry plate 23' is subjected to a developing process and a heating process to form the hologram 23. The incident angle of the reference wave L1 and the incident angle of the object wave L2 with respect to the hologram dry plate 23' are set to predetermined values A02 and B02 respectively. The wavelength of the light emitted from the laser 50, the developing process, and the heating process are designed so that the resulting hologram 23 can diffractively reflect only light of wavelengths in the predetermined range as shown in FIG. 4.

Figure 6:
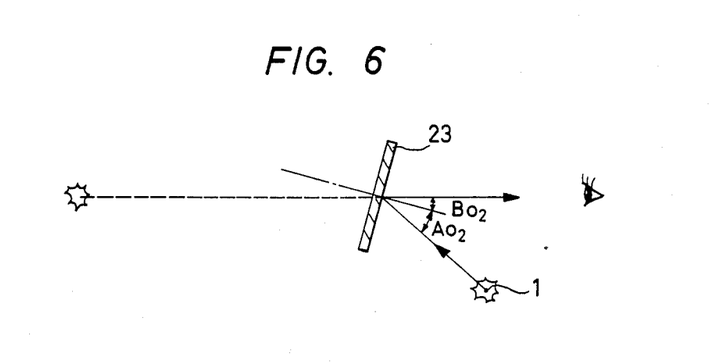
FIG. 6 is a diagram of a hologram and a light source.

As shown in FIG. 6, when the hologram 23 is located relative to a light source 1 so that the light emitted from the source 1 enters the hologram 23 at an incident angle equal to the incident angle A02 of the reference wave L1, the light is diffractively reflected by the hologram 23 at an outgoing angle equal to the incident angle B02 of the object wave L2 and forms a target image of the light source 1.

The hologram 22 is manufactured in a manner similar to the manufacture of the hologram 23 except for the following point. The incident angle of the reference wave and the incident angle of the object wave with respect to a hologram dry plate are set to predetermined values A01 and B01 respectively.

In order to compensate aberration, the angles A01, A02, B01, and B02 are chosen so as to satisfy the following equation.

$$[\cos(B1-\theta)/\cos B1]\cdot[(\sin A01 - \sin B01)/(\sin A02 - \sin B02)] = -1 \quad (1)$$

where the character B1 denotes the outgoing angle of the light with respect to the hologram 22, and the character $\theta$ denotes the angle of the hologram 22 relative to the hologram 23 (see FIGS. 1 and 2). As shown in FIGS. 1 and 2, the holograms 22 and 23, and the display tube 21 are relatively positioned so that the light emitted from the display tube 21 will enter the hologram 22 at an incident angle A1 equal to the value A01 and will be diffractively reflected by the hologram 22 at an outgoing angle B1 equal to the value B01, and that the light diffractively reflected by the hologram 22 will enter the hologram 23 at an incident angle A2 equal to the value A02 and will be diffractively reflected by the hologram 23 at an outgoing angle B2 equal to the value B02. For example, the angles A1, B1, A2, B2, and $\theta$ are set to 40°, 25°, 15°, 30°, and 10° respectively.

Operation

The display tube 21 emits information-indicating light toward the hologram 22. The hologram 22 selects the light of wavelengths in the predetermined range ($\lambda c - \Delta\lambda c$ to $\lambda c + \Delta\lambda c$) and diffractively reflects the selected light toward the hologram 23 at outgoing angles (B1−ΔB1 to B1+ΔB1). Since the equation (1) is satisfied, all the light moved from the hologram 22 to the hologram 23 is diffractively reflected by the hologram 23 in the direction corresponding to the outgoing angle B2. Accordingly, it is possible to obtain a clear image of the indicated information without chromatic aberration. The setting of the angle θ of the hologram 22 relative to the hologram 23 ensures that the unwanted ghost images are acceptably separate from the target image of the indicated information or that the unwanted ghost images are removed.

Removal of Ghost Image

Figure 7:
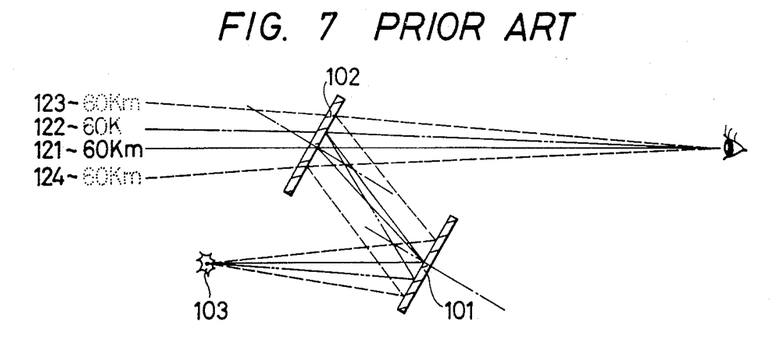
FIG. 7 is a diagram of a conventional head-up display system in which a pair of holograms are parallel.

FIG. 7 shows a conventional head-up display system in which a pair of holograms 101 and 102 are arranged in parallel to remove chromatic aberration. In the conventional display system of FIG. 7, light emitted from a light source or display tube 103 is diffractively reflected by the holograms 101 and 102 and then the light forms a target image 121 of information indicated on the display tube 103. Unwanted ghost images 122, 123, and 124 of the indicated information are formed in addition to the target image 121. The ghost image 122 results from the light reflected at the surfaces of the holograms 101 and 102. The ghost image 123 results from the light reflected at the surface of the hologram 101 and diffractively reflected by the hologram 102. The ghost image 124 results from the light diffractively reflected by the hologram 101 and reflected at the surface of the hologram 102. It should be noted that an incident angle differs from an outgoing angle in diffractive reflection and that an incident angle equals a reflection angle in surface reflection.

In cases where the diffraction efficiencies of the holograms 101 and 102 are 90% and 60% respectively and where each of the holograms 101 and 102 is provided with multi-layer coats producing a reflectivity of 1% in surface reflection, the user generally feels that the unwanted ghost images 123 and 124 are only slightly darker than the target image 121 although the unwanted ghost image 122 is adequately darker than the target image 121. Accordingly, if the ghost images 123 and 124 are close to the target image 121, they cause trouble in looking at the target image 121. When the distance between the holograms 101 and 102 is adequately great, the ghost images 122-124 move out of the normal driver's field of view so that they cause no trouble in looking at the target image 121. It was experimentally found that, in normal automotive vehicles, an adequately great distance between the holograms 101 and 102 could not be maintained because a space accommodating the head-up display system was considerably limited.

Figure 8:
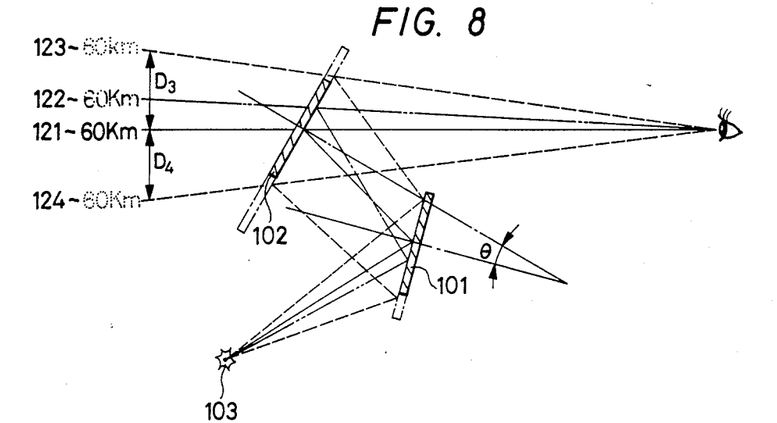
FIG. 8 and FIG. 9 are diagrams of head-up display systems in which a pair of holograms are nonparallel.
Figure 9:
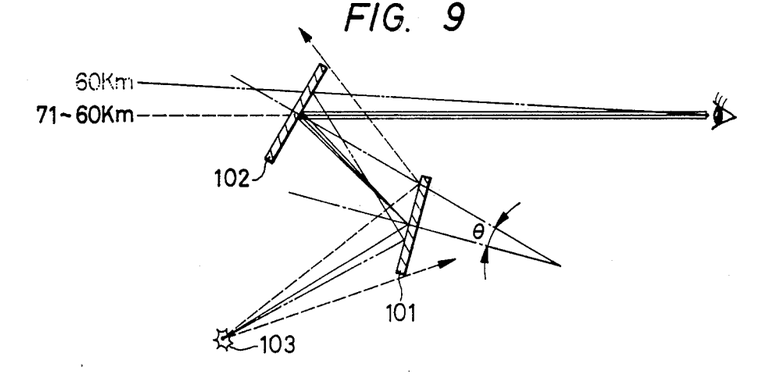

FIG. 8 shows a head-up display system in which a pair of holograms 101 and 102 are nonparallel so that the angle θ of the hologram 101 relative to the hologram 102 differs from zero. In the display system of FIG. 8, as the angle θ of the hologram 101 relative to the hologram 102 increases, the angular interval D3 between the ghost image 123 and the target image 121 and the angular interval D4 between the ghost image 124 and the target image 121 also increase. Accordingly, suitable choice of the angle θ of the hologram 101 relative to the hologram 102 allows the brighter ghost images 123 and 124 to be adequately distant from the target image 121. As shown in FIG. 9, suitable choice of the size of the hologram 102 allows the brighter ghost images 123 and 124 to move out of the normal driver's field of view. When the reflectivities of the holograms 101 and 102 are in the range of about 0.5-1.0%, the brightness of the remaining unwanted ghost image 122 is smaller than one thousandth of the brightness of the target image 121 so that the ghost image 122 causes essentially no trouble in looking at the target image 121.

As the angle θ of the hologram 101 relative to the hologram 102 increases, the ghost images are more effectively removed. When the angle θ of the hologram 101 relative to the hologram 10 is excessively large, the target image is distorted unacceptably and a problem occurs in the field where the target image extends. Accordingly, the angle θ of the hologram 101 relative to the hologram 102, that is, the angle θ of the hologram 22 relative to the hologram 23 in the display system of FIGS. 1-3, is preferably in the range of +5° to +20° and in the range of −5° to −20°.

Removal of Chromatic Aberration

In the case where the angles A1, B1, A2, and B2 are equal to the angles A01, B01, A02, and B02 respectively, the components of display tube light which have wavelengths in the range of $\lambda c - \Delta \lambda c$ to $\lambda c + \Delta \lambda c$ are diffractively reflected by the hologram 22 in the directions corresponding to the angular range of $B1 - \Delta B1$ to $B1 + \Delta B1$. Since the value $\Delta \lambda c$ is extremely small, these components of display tube light are diffractively reflected by the hologram 23 essentially in a common direction corresponding to an angle B2. Accordingly, it is possible to obtain a target image of indicated information without chromatic aberration.

Aberration Compensating Condition

Figure 10:
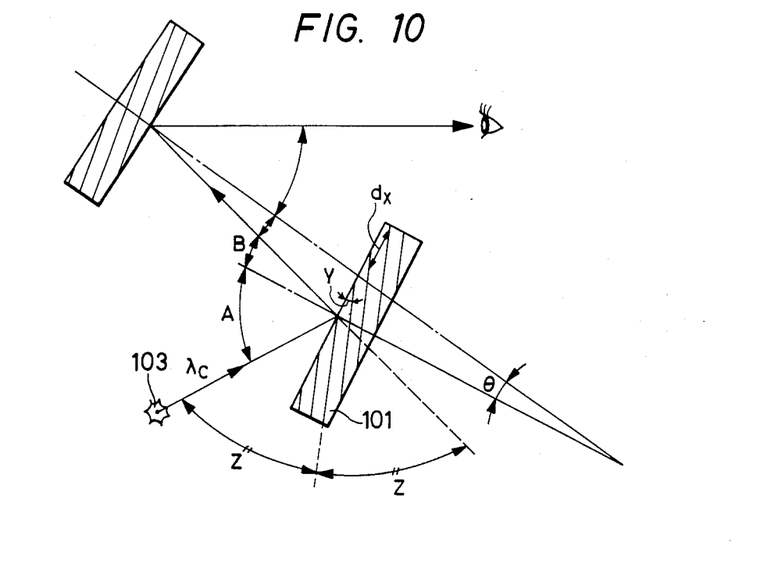
FIG. 10 is a diagram of a head-up display system.

In a head-up display system including a hologram 101 and a display tube 103 as shown in FIG. 10, diffractive reflection by the hologram 101 is generally expressed in the following equation.

$$dx(\sin A - \sin B) = \pm \lambda c / nc \qquad (2)$$

where the characters dx, λc, nc, A, and B denote the horizontal interval of diffraction grating of the hologram, the wavelength of incident light emitted from the display tube 103, the mean refractive index of the hologram, the incident angle of the light with respect to the hologram, and the outgoing angle of the light with respect to the hologram, respectively.

The angle Y of the diffraction grating and the angle (Bragg angle) Z between the direction of travel of the light and the diffraction grating are given by the following equations.

$$Y = (A0 - B0)/2 \qquad (3)$$

$$Z = (\pi - A0 - B0)/2 \qquad (4)$$

where the character A0 denotes the incident angle of reference wave used during the manufacture of the hologram, and the character B0 denotes the incident angle of object wave used during the manufacture of the hologram.

The horizontal interval dx of the diffraction grating is also expressed in the following equation.

$$dx = (\pi 0/n0)/(\sin Y \cdot 2 \sin Z) = (\lambda 0/n0)/(\sin A0 - \sin B0) \qquad (5)$$

where the character λ0 denotes the wavelength of laser light used in the manufacture of the hologram, and the character n0 denotes the mean refractive index of the hologram during the exposure process in the manufacture.

The equations (2) and (5) are combined to form the following equation giving the outgoing angle B.

$$\sin B = \sin A - [(\sin A0 - \sin B0)(\lambda c/nc)/(\lambda 0/n0)] \quad (6)$$

This equation (6) can be applied to the hologram 23 as well as the hologram 22.

Under conditions where the mean refractive index nc equals the mean refractive index n0, the equation (6) is rewritten with respect to the hologram 22 as follows.

$$\sin B1 = \sin A1 - (\sin A01 - \sin B01)(\lambda c/\Delta 0) \quad (7)$$

Also, the equation (6) is rewritten with respect to the hologram 23 as follows.

$$\sin B2 = \sin A2 - (\sin A02 - \sin B02)(\lambda c/\Delta 0) \quad (8)$$

In view of the fact that the holograms 22 and 23 diffractively reflect only light having wavelengths in the predetermined range of $\lambda c - \Delta \lambda c$ to $\lambda c + \Delta \pi c$, conditions will be derived under which variations in the outgoing angle B2 are null over the predetermined wavelength range.

The equations (7) and (8) are differentiated with $\lambda c$ and the following equations are derived.

$$d\sin B1/d\lambda c = -(\sin A01 - \sin B01)/\lambda 0 = S1 \quad (9)$$

$$d\sin B2/d\lambda c = (d\sin A2/d\lambda c) - (\sin A02 - \sin B02)/\lambda 0 \quad (10)$$

It should be noted that $d\sin A1/d\lambda c$ equals 0. Since $A2 = B1 - \theta$, the following equation is derived from the equations (9) and (10).

$$d\sin B2/d\lambda c = S1 \cos\theta + S1(\sin B1/\cos B1)\sin\theta + S2 \quad (11)$$

where $S2 = -(\sin A02 - \sin B02)/\lambda 0$. The conditions under which the variation $d\sin B2/d\lambda c$ in the outgoing angle B2 is null induce the following equation by reference to the equation (11).

$$[\cos(B1-\theta)/\cos B1] \cdot [(\sin A01 - \sin B01)/(\sin A02 - \sin B02)] = -1 \quad (12)$$

When the incident angles A1 and A2 are equal to the incident angles A01 and A02 of the reference rays used during the exposure processes, the outgoing angles B1 and B2 are equal to the incident angles B01 and B02 of the object rays used during the exposure processes respectively. Accordingly, the equation (12) is converted into the following equation.

$$[\cos(B1-\theta)/\cos B1] \cdot [(\sin A1 - \sin B1)/(\sin A2 - \sin B2)] = -1 \quad (13)$$

When the holograms 22 and 23 are designed and arranged so that the equation (13) is satisfied, the variation in the outgoing angle B2 corresponding to the chromatic aberration is nullified. This means that the chromatic aberration can be removed by an arrangement in which the holograms 22 and 23 are not parallel. A higher degree of freedom in designing of the angles and position of the holograms 22 and 23, and the display tube 21 is thus allowed, the hologram display system can be disposed in a limited space within the automotive vehicle around the vehicle dashboard in a manner such as to ensure that the chromatic aberration and the unwanted ghost images are removed.

Hologram Diffraction Efficiency and Surface Reflection

The target image of the indicated information is brighter as the diffraction efficiencies of the holograms 22 and 23 increase. It should be noted that the vehicle driver looks at the forward scene through the hologram 23. If the diffraction efficiency of the hologram 23 is excessively high, the components of forward scene light which have wavelengths in the predetermined range are also diffractively reflected by the hologram 23 so that there is a problem in the colors of an image of the forward scene. Accordingly, the diffraction efficiency of the hologram 23 is preferably smaller than 80%. The diffracton efficiency of the hologram 23 is preferably close to 80% for use only during the daytime. The diffraction efficiency of the hologram 23 is preferably around 30% from the standpoint of the color problem in the image of the forward scene. Thus, the diffraction efficiency of the hologram 23 is most preferably in the range of about 30 to 80%. In one example, the diffraction efficiencies of the holograms 22 and 23 are 93% and 73% respectively. In another example, the diffraction efficiencies of the holograms 22 and 23 are 90% and 60% respectively.

As described previously, the surfaces of the holograms 22 and 23 are provided with the multilayer coats 22a and 23a which allow the reflectivities of the holograms to be in the range of about 0.5 to 1.0% and thus which remove the ghost image resulting from the light reflected at the surfaces of the holograms.

It should be noted that the color of light which is used by the head-up display system 20 may be different from the green-based color.

Lights of a plurality of colors may be indicated by the head-up display system 20. In this case, the holograms 22 and 23 are modified so that they can act on lights of different colors. For example, during the manufacture of the holograms 22 and 23, hologram dry plates are exposed to lights of different colors. In another example, each of the holograms 22 and 23 is composed of a combination of sub-holograms which can operate on lights of different colors respectively. Furthermore, the positions of target images formed by lights of different colors may be differentiated from each other. In this case, during the manufacture of the holograms 22 and 23, hologram dry plates are exposed to lights of different colors with different focal points.

The display tube 21 may be replaced by a cathode ray tube, an array of light emitting diodes, or a liquid crystal display exposed to display illumination from its back. In addition, the display tube 21 may be replaced by any combination of a fluorescent character display tube, a cathode ray tube, an array of light emitting diodes, and a liquid crystal display.

In general, the holograms 22 and 23 have essentially flat surfaces. The holograms 22 and 23 may have curved surfaces.

DESCRIPTION OF THE SECOND PREFERRED EMBODIMENT

Figure 11:
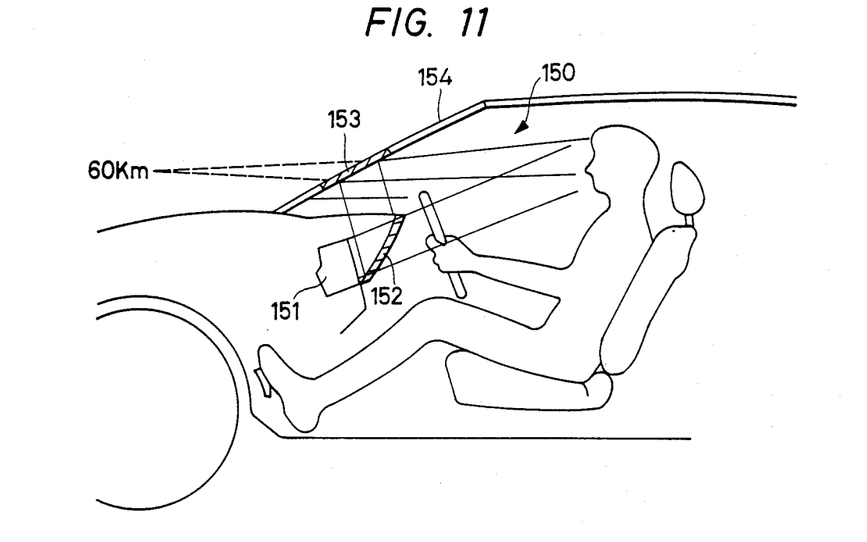
FIG. 11 is a diagram of an automotive vehicle equipped with a holographic head-up display system according to a second embodiment of this invention.

With reference to FIG. 11, a holographic head-up display system 150 according to a second embodiment of this invention includes a color cathode-ray tube (CRT) 151 attached to a front panel extending within an automotive vehicle. The vehicle driver can directly look at the CRT 151 when the driver is seated in position within the vehicle. The CRT 151 indicates various information including vehicle operating conditions such as the current vehicle speed or the current engine speed. Holograms 152 and 152 are designed and arranged in a manner similar to the holograms 22 and 23 in the embodiment of FIGS. 1-3. Accordingly, the holograms 152 and 153 diffractively reflect only light having wavelengths in the predetermined range, that is, light of a green-based color, and transmit light having other wavelengths. The hologram 152 extends in front of the CRT 151 and receives the light emitted from the CRT 151. The hologram 153 is attached to the vehicle windshield 154 and receives the light reflected by the hologram 152.

Figure 12:
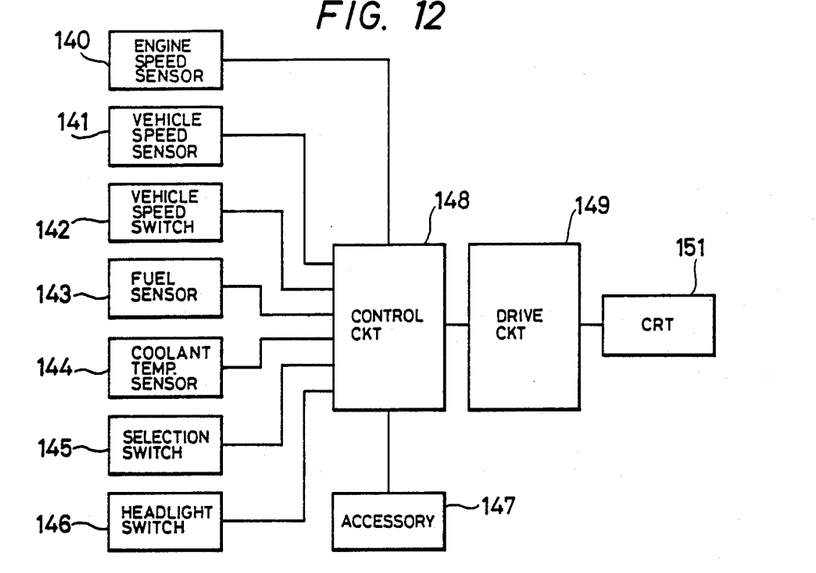
FIG. 12 is a block diagram of an apparatus controlling the cathode ray tube in the head-up display system of FIG. 11.

As shown in FIG. 12, a sensor 140 generates a signal representative of engine speed which is applied to a control circuit 148. A sensor 141 generates a signal representative of vehicle speed which is applied to the control circuit 148. A switch 142 which can be actuated by the vehicle driver generates a signal representative of an arbitrarily set vehicle speed. A sensor 143 generates a signal representative of the quantity of remaining fuel which is applied to the control circuit 148. A sensor 144 generates a signal representative of engine coolant temperature which is applied to the control circuit 148. A switch 145 which can be actuated by the driver generates a signal for selecting information indicated by the head-up display system 150. The signal generated by the switch 145 is applied to the control circuit 148. A switch 146 which can be actuated by the driver generates a signal for changing vehicle headlights between high beam states and low beam states. The signal generated by the switch 146 is applied to the control circuit 148. In addition, there is a vehicle accessory 147 such as a clock or a navigation system. The accessory 147 generates a signal representative of related information which is applied to the control circuit 148.

The control circuit 148 receives the signals from the devices 140–147 and calculates final values of information data to be displayed. In addition, the control circuit 148 selects information to be indicated by the head-up display system 150. Specifically, when the vehicle speed represented by the signal from the vehicle speed sensor 141 exceeds 100 Km/h or when the engine speed represented by the signal from the engine speed sensor 140 exceeds a given speed, the control circuit 148 outputs a head-up signal of related warning information to a drive circuit 149. As will be described hereinafter, when the drive circuit 149 receives the head-up signal, the drive circuit 149 controls the CRT 151 to allow the related information to be indicated by the head-up display system 150. Furthermore, the control circuit 148 outputs a head-up signal to the drive circuit 149 when the vehicle speed exceeds a set speed determined by the signal from the vehicle speed setting switch 142, when the quantity of remaining fuel represented by the signal from the fuel sensor 143 drops below a given quantity, when the engine coolant temperature represented by the signal from the engine coolant temperature sensor 144 exceeds a given temperature, or when the vehicle headlights are changed to the high beam states. In addition, when the information selection switch 145 is actuated, the control circuit 148 outputs a head-up signal of selected information to the drive circuit 149.

In the absence of any head-up signal, the drive circuit 149 controls the CRT 151 so that the CRT 151 indicates information with light of wavelengths which can be transmitted through the hologram 152. Specifically, in this case, the CRT 151 uses light of a color different from the green-based color. Accordingly, in this case, the vehicle driver can look at the indicated information on the CRT 151 through the hologram 152. In the presence of a head-up signal, the drive circuit 149 controls the CRT 151 so that the CRT 151 indicates the related information with light of a wavelength in the predetermined range which is diffractively reflected by the hologram 152. Specifically, in this case, the CRT 151 uses light of the green-based color. Accordingly, in this case, the related information is indicated by the head-up display system 150.

When the vehicle driver actuates the information selection switch 145 and selects the vehicle speed as information to be indicated by the head-up display system 150, the control circuit 148 outputs a head-up signal of the vehicle speed to the drive circuit 149. In response to the head-up signal, the drive circuit 149 controls the CRT 151 so that the wavelength of the light indicative of the vehicle speed emitted by the CRT 151 changes into the predetermined wavelength range or the color of the light indicative of the vehicle speed changes to green, and thus the vehicle speed is indicated by the head-up display system. The wavelength of the light indicative of other information emitted by the CRT 151 remains outside the predetermined range, so that the other information is not indicated by the head-up display system 151 but the vehicle driver can look at the other information on the CRT 151 through the hologram 152. The light indicative of the vehicle speed is diffractively reflected by the hologram 152 toward the hologram 153 and is then diffractively reflected by the hologram 153, forming an image of the indication of the vehicle speed in the driver's field of front view. Since the diffraction efficiency of the hologram 152 is chosen to be about 50%, part of the light indicative of the vehicle speed passes through the hologram 152 so that the vehicle driver can also directly look at the indication of the vehicle speed on the CRT 151. Generally, 90% of the light indicative of the other information passes through the hologram 152 so that the vehicle driver can directly look at a clear indication of the other information on the CRT 151.

When the vehicle driver actuates the information selection switch 145 and selects information other than the vehicle speed, the control circuit 148 outputs a head-up signal of the selected information to the drive circuit 149. In response to the head-up signal, the drive circuit 149 controls the CRT 151 and thus the wavelength of the light indicative of the selected information emitted by the CRT 151 changes into the predetermined wavelength range, so that the selected information is indicated by the head-up display system. The wavelength of the light indicative of other information emitted by the CRT 151 remains outside the predetermined range, so that the other information is not indicated by the head-up display system 151 but the vehicle driver can directly look at the other information on the CRT 151. The light indicative of the selected information is diffractively reflected by the hologram 152 toward the hologram 153 and is then diffractively reflected by the hologram 153, forming an image of the indication of the selected information in the driver's field of front view.

When the engine coolant temperature exceeds the given temperature, when the quantity of remaining fuel drops below the given quantity, or when the vehicle speed exceeds the given speed, the control circuit 148 outputs a head-up signal of the related information to the drive circuit 149. In response to the head-up signal, the drive circuit 149 controls the CRT 151 and thus the wavelength of the light indicative of the related information emitted by the CRT 151 changes into the predetermined wavelength range, so that the related information is indicated by the head-up display system. The wavelength of the light indicative of other information emitted by the CRT 151 remains outside the predetermined range, so that the other information is not indicated by the head-up display system 151 but the vehicle driver can directly look at the other information on the CRT 151. The light indicative of the information related to the head-up signal is diffractively reflected by the hologram 152 toward the hologram 153 and is then diffractively reflected by the hologram 153, forming an image of the indication of the information in the driver's field of front view.

It should be noted that the color of light which is used by the head-up display system 150 may be different from the green-based color.

Lights of a plurality of colors may be indicated by the head-up display system 150. In this case, the holograms 152 and 153 are modified so that they can act on lights of different colors. For example, during the manufacture of the holograms 152 and 153, hologram dry plates are exposed to lights of different colors. In another example, each of the holograms 152 and 153 is composed of a combination of sub-holograms which can operate on lights of different colors respectively. It is preferable that different informations are indicated by lights of different colors respectively. Furthermore, the positions of target images formed by lights of different colors may be differentiated from each other. In this case, during the manufacture of the holograms 152 and 153, hologram dry plates are exposed to lights of different colors with different focal points.

The CRT 151 may be replaced by a fluorescent character tube, an array of light emitting diodes, or a liquid crystal display exposed to display illumination from its back. In addition, the CRT 151 may be replaced by any combination of a fluorescent character display tube, a cathode ray tube, an array of light emitting diodes, and a liquid crystal display.

DESCRIPTION OF THE OTHER PREFERRED EMBODIMENTS

Figure 13:
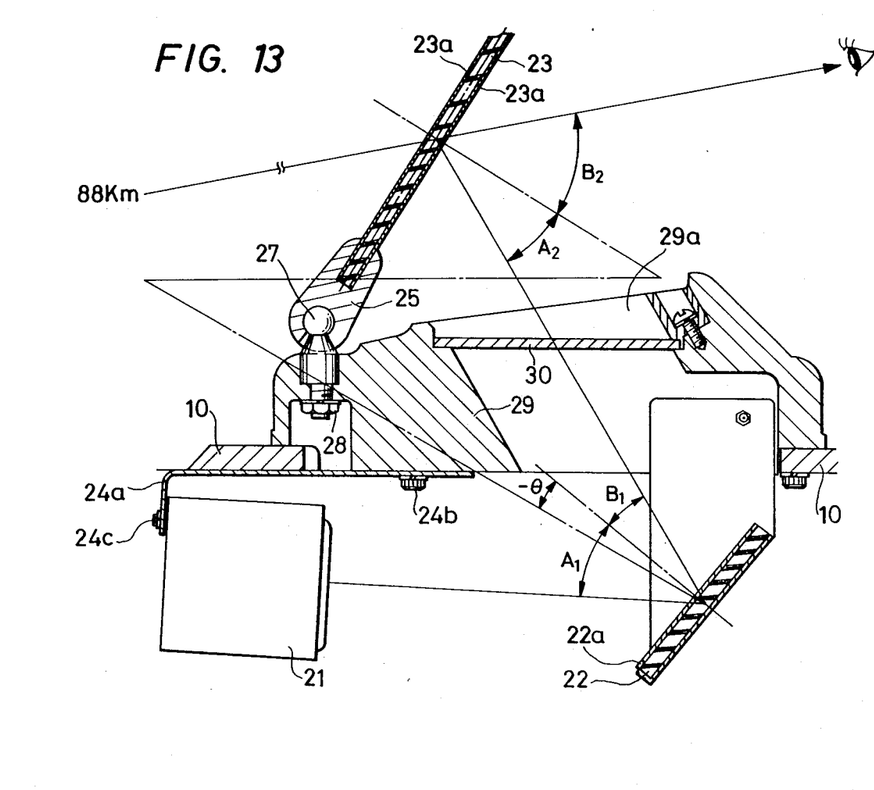
FIG. 13 is a diagram of a holographic display system according to a third embodiment of this invention.

FIG. 13 shows a third embodiment of this invention, which is similar to the embodiment of FIGS. 1-3 except that the angle of the hologram 22 relative to the hologram 23 equals an angle of $-\theta$. It should be noted that, in the embodiment of FIGS. 1—3, the angle of the hologram 22 relative to the hologram 23 equals an angle of $\theta$. The operation and effect of the embodiment of FIG. 13 are essentially similar to those of the embodiment of FIGS. 1-3.

Figure 14:
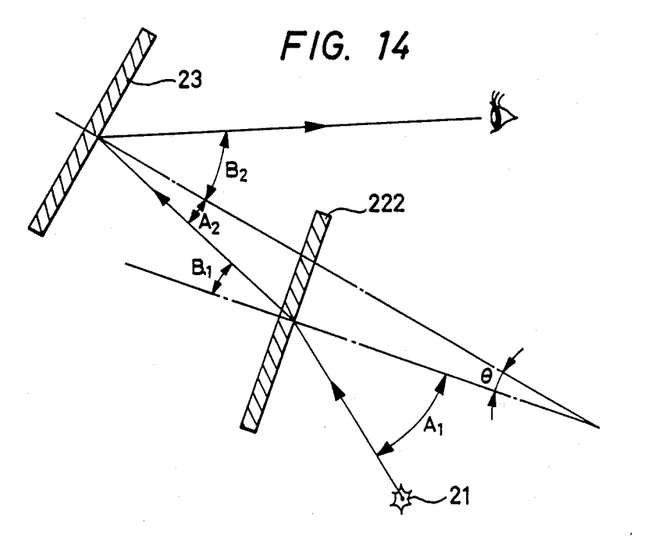
FIG. 14 is a diagram of a holographic display system according to a fourth embodiment of this invention.

FIG. 14 shows a fourth embodiment of this invention, which is similar to the embodiment of FIGS. 1-3 except that a transmission hologram or Fresnel hologram 222 is used in place of the reflection hologram 22 (see FIGS. 1 and 2). In the embodiment of FIG. 14, the light emitted from the display tube 21 and indicating information passes diffractively trough the hologram 222 and is then diffractively reflected by the hologram 23, forming an image of the indicated information in the vehicle driver's field of view. The light enters the hologram 222 at an incident angle A1 and moves from the hologram 222 at an outgoing angle B1 as in the embodiment of FIGS. 1-3.

What is claimed is:

1. A holographic display system comprising:
   (a) a display source emitting light;
   (b) a first hologram receiving the light from the display source and diffracting the received light, wherein the light from the display source is applied to the first hologram at an incident angle A1 and moves from the first hologram at an outgoing angle B1; and
   (c) a second hologram receiving the light from the first hologram and diffractively reflecting the received light, wherein the light diffractively reflected by the second hologram forms an image of the display source in viewer's field of view, and wherein the light from the first hologram is applied to the second hologram at an incident angle A2 and moves from the second hologram at an outgoing angle B2;
   wherein the first and second holograms are nonparallel to remove a ghost image of the display source which would result from at least one of surface reflections at the first and second holograms, wherein the first hologram has an angle $\theta$ relative to the second hologram, and wherein the angles A1, B1, A2, B2, and $\theta$ are in a fixed relationship to remove chromatic aberration which would result fro the nonparallel arrangement of the first and second holograms.

2. The holographic display system of claim 1 wherein the angle $\theta$ is in a range of $+5°$ to $+20°$ and a range of $-5°$ to $-20°$.

3. The holographic display system of claim 1 wherein the fixed relationship is expressed by an equation as follows:

$$(\cos(B1-\theta)/\cos B1)\cdot((\sin A1 - \sin B1)/(\sin A2 - \sin B2)) = -1.$$

4. The holographic display system of claim 1 wherein the first and second holograms have surfaces provided with multilayer coats preventing surface reflection.

5. The holographic display system of claim 1 wherein the first hologram diffractively reflects a first component of the display source light toward the second hologram and transmits a second component of the display source light, and the display source is allowed to be seen from the viewer through the first hologram.

6. The holographic display system of claim 1 wherein the first and second holograms act on essentially only light having a wavelength in a predetermined range, and the light emitted from the display source has a wavelength in the predetermined range.

7. The holographic display system of claim 6 wherein the first and second holograms have diffraction efficiencies which peak at essentially equal predetermined light wavelengths respectively.

8. The holographic display system of claim 7 wherein the diffraction efficiency of the first hologram is essentially higher than 80%.

9. The holographic display system of claim 7 wherein the diffraction efficiency of the second hologram is essentially in the range of 30 to 80%.

10. The holographic display system of claim 7 wherein the diffraction efficiency of the first hologram is essentially higher than 80%, and the diffraction efficiency of the second hologram is essentially in the range of 30 to 80%.

* * * * *